No. 893,042. PATENTED JULY 14, 1908.
J. WEST.
ENVELOP MACHINE.
APPLICATION FILED JUNE 28, 1902.

Witnesses:
Jas. E. Hutchinson.
J. L. Lawlor.

Inventor.
James West,
by Edwin J. Prindle,
his Atty.

No. 893,042. PATENTED JULY 14, 1908.
J. WEST.
ENVELOP MACHINE.
APPLICATION FILED JUNE 28, 1902.

Witnesses:
Jas. E. Hutchinson.
J. L. Lawlor.

Inventor.
James West,
by Edwin J. Prindle,
his Atty.

No. 893,042. PATENTED JULY 14, 1908.
J. WEST.
ENVELOP MACHINE.
APPLICATION FILED JUNE 28, 1902.

Witnesses:
Jas. E. Hutchinson.
J. L. Lawlor.

Inventor
James West,
by Edwin J. Prindle,
his Atty.

No. 893,042. PATENTED JULY 14, 1908.
J. WEST.
ENVELOP MACHINE.
APPLICATION FILED JUNE 28, 1902.

Witnesses:
Jas. E. Hutchinson.
J. L. Lawlor.

Inventor.
James West,
by Edwin J. Prindle,
his Atty.

No. 893,042. PATENTED JULY 14, 1908.
J. WEST.
ENVELOP MACHINE.
APPLICATION FILED JUNE 28, 1902.

UNITED STATES PATENT OFFICE.

JAMES WEST, OF BROOKLYN, NEW YORK, ASSIGNOR, BY MESNE ASSIGNMENTS, OF ONE-HALF TO SAMUEL CUPPLES ENVELOPE COMPANY, OF ST. LOUIS, MISSOURI, A CORPORATION OF MISSOURI, AND ONE-HALF TO UNITED STATES ENVELOPE COMPANY, OF SPRINGFIELD, MASSACHUSETTS, A CORPORATION OF MAINE.

ENVELOP-MACHINE.

No. 893,042.    Specification of Letters Patent.    Patented July 14, 1908.

Application filed June 28, 1902. Serial No. 113,652.

*To all whom it may concern:*

Be it known that I, JAMES WEST, of Brooklyn, in the county of Kings and in the State of New York, have invented a certain new and useful Improvement in Envelop - Machines; and I do hereby declare that the following is a full, clear, and exact description thereof, reference being had to the accompanying drawings, in which—

The object of my invention has been to provide a machine for making envelops which shall have, among others, the advantages of being simple; of being effective and certain in its operation; of being readily adapted to the making of widely different forms of envelops, and especially of being capable of making such envelops from a continuous strip of paper, and to such ends, my invention consists in the envelop machine hereinafter specified.

Figure 1:
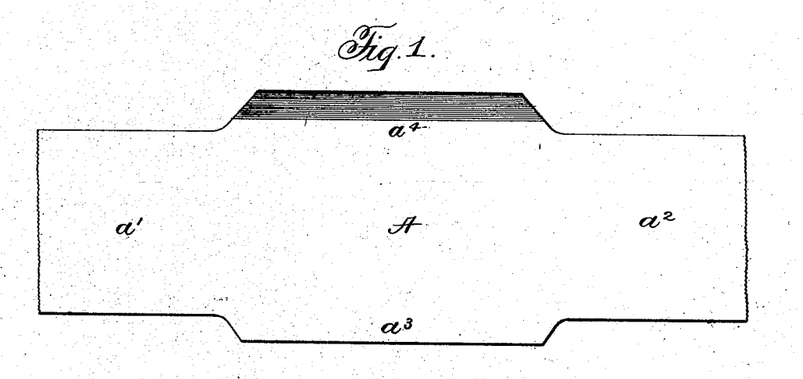
Figures 1 to 4, inclusive, are views illustrating the steps followed by my machine in making one form of safety envelop.
Figures 2, 3, 4:
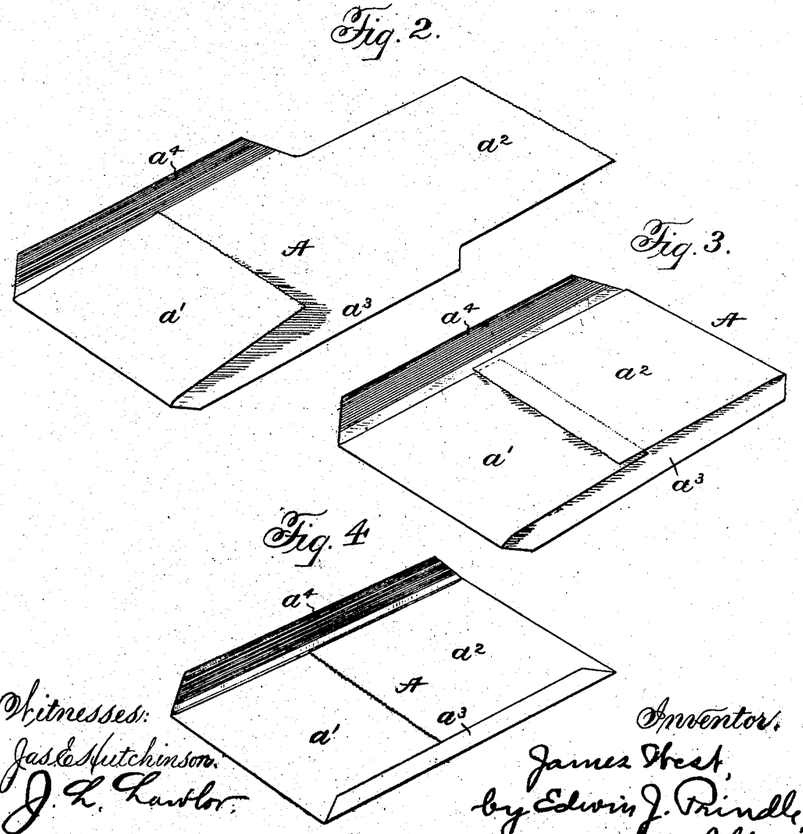
Figure 5:
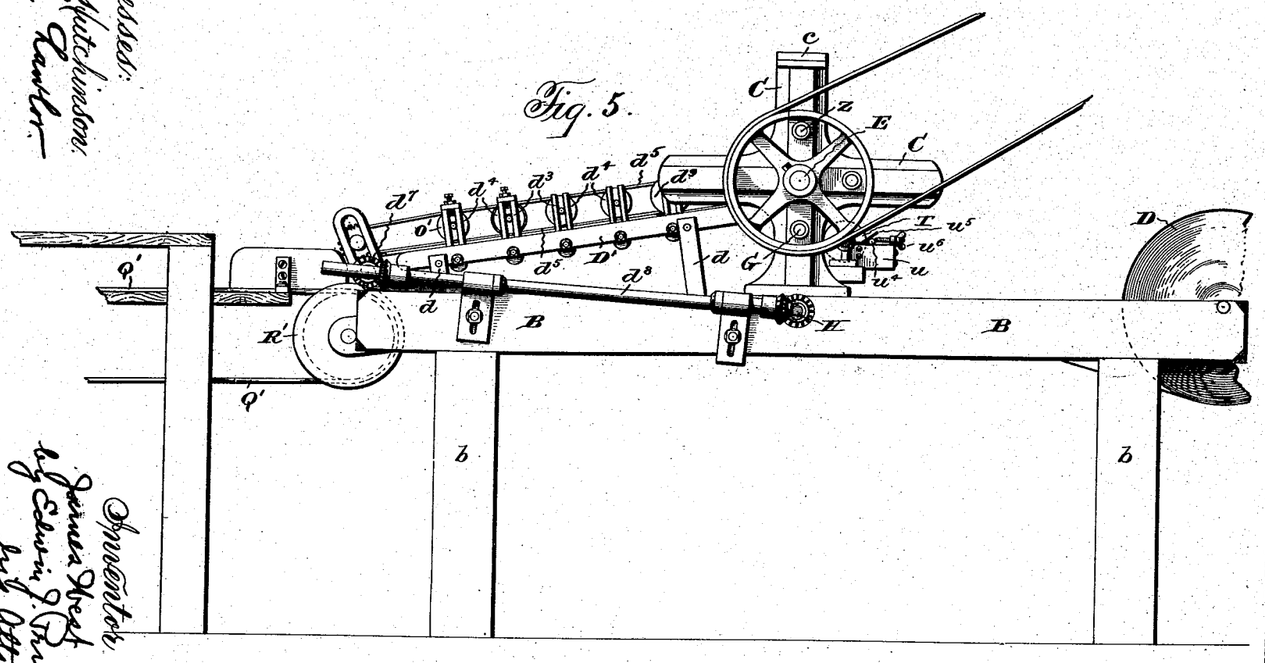
Fig. 5 is a side elevation of an envelop machine embodying my invention.

The machine which I have chosen for illustration is fitted to make the envelop A shown in Figs. 1 to 4. Such envelop is formed from a blank, illustrated in Fig. 1, such blank consisting of a strip having parallel sides, the central portion of the strip being wider than its ends, and the edges of such wider portions being connected with the said ends by oblique edges. In forming the envelop one of the ends $a'$ is first turned over upon the body portion of the blank, as illustrated in Fig. 2. The opposite end $a^2$ is then turned over and secured to the first end, as illustrated in Fig. 3. The wider portion of the blank constitutes beside the body, a narrow flap $a^3$ and a wider flap $a^4$. The narrow flap is turned over upon the ends $a'$ and $a^2$, and is secured thereto, thus closing the bottom of the envelop. The wider or upper flap $a^4$ is provided with glue or other adhesive material, and is then turned over, but is not secured to the ends $a'$ and $a^2$. The flap $a^4$ is the flap which is sealed by the user in closing the envelop.

Figure 6:
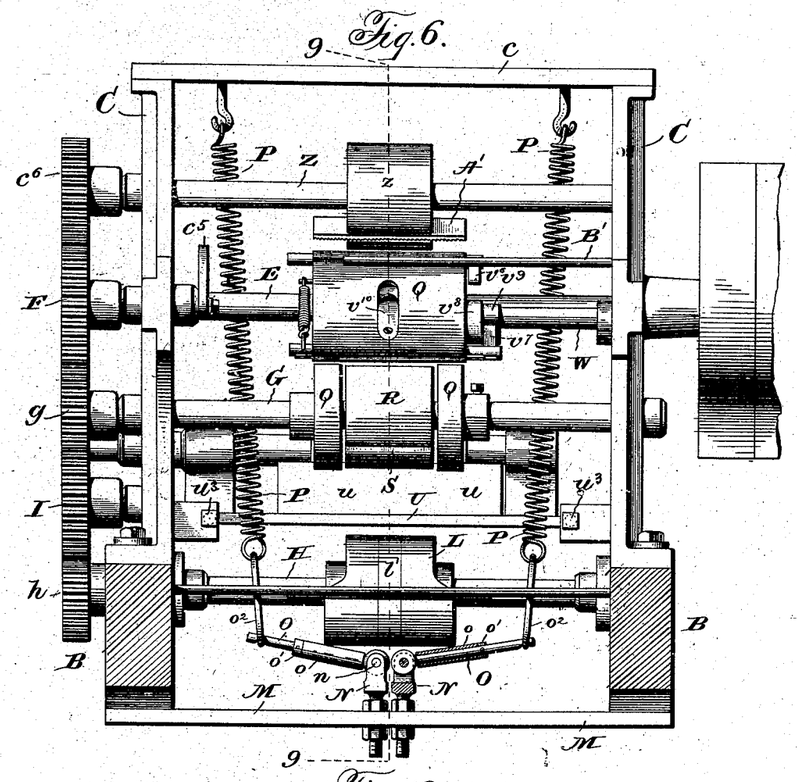
Fig. 6 is a rear view of the machine, the belt conveyer and flap-folding parts being removed.
Figure 7:
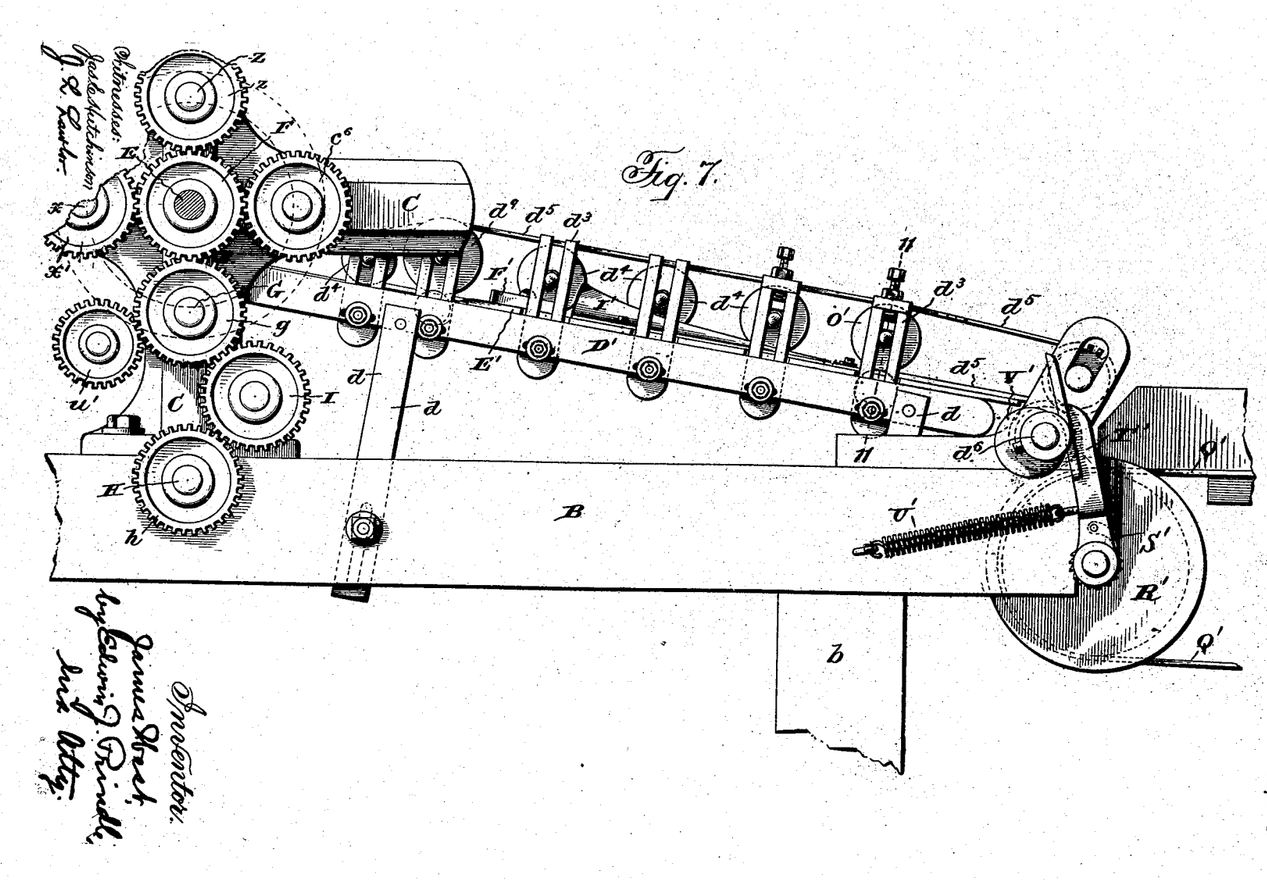
Fig. 7 is a similar view to that of Fig. 1, taken from the opposite side, such view being on a larger scale than said figure, and parts at the both ends of the machine being broken away.
Figure 17:
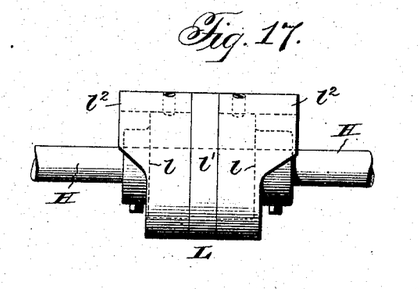
Fig. 17 is an elevation of the cutting cylinder.

In carrying my invention into practice, I provide a frame which preferably consists of parallel horizontal beams B, which are suitably supported, as by legs $b$ and upon such beams are side frames C in the form of a Greek cross, the side frame C being connected at the top by a cross bar $c$. Means are provided upon the beams B to support a roll of paper D. A driving shaft E is journaled at the center of the side frames C, and upon one end of such driving shaft are the usual fast and loose pulleys, while upon the other end a pinion F is fixed. Beneath the driving shaft, a shaft G is mounted in the side frames, such shaft having a pinion $g$ which meshes with the pinion F on the driving shaft. Beneath the shaft G is a shaft H having fixed thereon a pinion $h$ which is geared to the pinion F by an idler I. In the rear of the shaft H, a shaft carrying a guide roller K is journaled. Upon the shaft H the cutting cylinder L is mounted. Such cylinder has a periphery whose form when developed is preferably that of the blank from which the envelop is to be made. The cutting cylinder, as illustrated in Figs. 6 and 17 is preferably made in three parts. There is a body which is fixed upon the shaft and which has portions $l$ of smaller diameter separated by a central portion $l'$ of larger diameter. Sleeve sections $l^2$ are mounted upon the portions $l$ of smaller diameter and are secured thereto as by set screws. The portion $l'$ is preferably of the same diameter as the peripheries of the portions $l^2$. The outer edges of the sleeve sections are made of the shape which it is desired to give the edges of the blanks, and may be varied, as desired, according to the envelop which is to be made. The sleeve sections are preferably made of hardened steel, and the outer edges are preferably made sharp, the surfaces at such edges preferably meeting at a right angle, although such edges and angle can be varied, as desired, or as circumstances may require. A rod $l^3$ is secured in the frame, parallel and near to the rear face of the cutting cylinder, and such rod preferably has a plate $l^4$ secured upon its under side. Spring rods $l^5$ are secured to the frame, extend under and bear upon the plate $l^4$, and yieldingly rest against the edges of the cutting cylinder. The tension of the said rods is upward and toward each other, so that they constantly touch the cutting edges of the cutting cylinder, and strip off any cuttings that are formed.

A bar M extends across the frame beneath the beams B, and threaded bolts N are mounted vertically on the said bar, as by nuts engaging the threaded portions of the bolts upon opposite sides of the said bar. The said bolts are preferably forked at their upper ends, and cylindrical rods or shafts O are pivoted in the said forks, as by pins passing through the said forks and through eyes, one of which is formed upon each of the said rods. Cutting rolls $o$ are journaled upon said rods, being held from lateral movement by collars $o'$ which are secured upon the said rods. The said cutting rolls are preferably of hardened steel, and are held against the edges of the cutting cylinder as by springs P that are supported at their upper ends upon hooks fastened in the top cross bar $c$, and that support the rods O by rings $o^2$ secured to the lower ends of the said springs and engaging notches on the under sides of the rods O. The cutting rolls stand at an angle to the periphery of the cutting cylinder, and such angle may be adjusted by means of the nuts on the bolts N. The angle at which the cutting rolls stand to the periphery of the cutting cylinder can be varied, as desired, from a very acute angle to or beyond a right angle.

Figure 15:
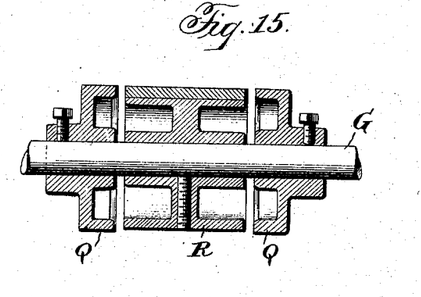
Fig. 15 is a sectional view of the glue applying devices.
Figure 16:
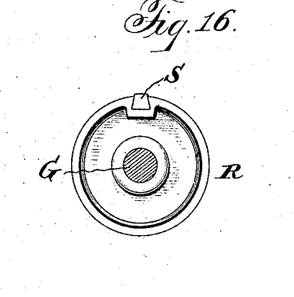
Fig. 16 is a side elevation of the rolls carrying the glue applying type bar.

Upon the shaft G, the glue applying devices are mounted, such devices, in the instance chosen for illustration, comprising disks Q which may be circular or may be higher in those portions where it is desired to apply the glue. Between the said disks Q is, as shown in Figs. 6, 15 and 16, a cylinder R which is of smaller diameter than the disks Q, and which has secured to it, as by dovetailing, a type-bar S which extends parallel with the shaft F, and whose outer face is flush with the peripheries of the disks Q. Glue is supplied to the disks Q and the bar S by such means as a roller T, the latter being mounted on a shaft in bearings upon a bar U upon which is also mounted a rectangular glue pan $u$. The shaft of the glue applying roller is provided with a pinion $u'$ that meshes with the pinion $g$, before described. The bar U engages guides formed in arms that are secured to the side frames. Springs $u^2$ are connected to the frame and to the bar U, and tend to draw the glue pan toward the glue applying devices, the movement in such direction being limited by screws $u^3$ that are threaded in the said arms. A scraper bar $u^4$ rests upon the upper edges of the glue pan forward of the glue-transferring roller T, and such bar is held down upon the said edges by leaf-springs $u^5$ that are pivoted upon lugs formed on the glue pan. The said springs are bent at an angle to the edges of the glue pan, so that they tend to force the bar away from the glue applying roller. Thumb screws $u^6$ regulate the distance at which the scraper bar stands away from the glue transferring roller under the action of the said springs. The scraper bar can be readily removed by swinging the springs from over the said bar and lifting the bar from behind the screws $u^6$. The bar can be instantly replaced in adjusted position, since it is not necessary to turn the screws $u^6$ in order to remove it. The glue pan and all its attached parts can also be readily removed by disengaging the springs $u^2$ from the bar U; and, as this can be done without turning the screws $u^3$, the glue pan can be quickly replaced to operative and adjusted position by simply placing the bar U upon its guides and reëngaging the springs $u^2$.

Figure 10:
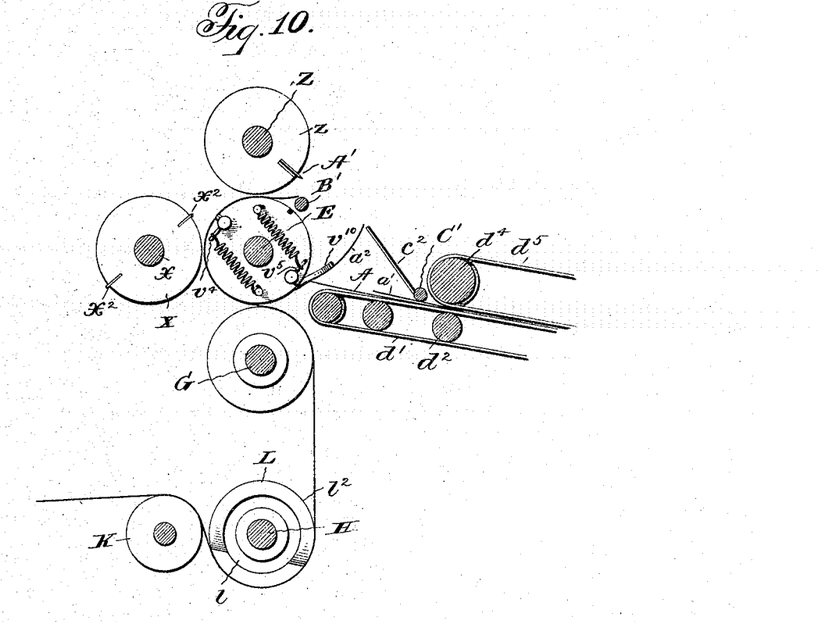
Fig. 10 is a diagrammatic view of the chief operating parts of the machine.

A draw-folding roller V is mounted upon the driving shaft E. The said roller is provided with shafts $v$ and $v'$, respectively, which are mounted in cylindrical bearings formed near the periphery of the said roller and parallel to the axis of the same. Draw-folding blades $v^2$ and $v^3$ are mounted upon the shafts $v$ and $v'$, respectively, the said blades occupying slots opening from the bearings of the said shafts to the periphery of the roller. The shafts $v$ and $v'$ are each provided upon one end with an arm $v^4$ and $v^5$, respectively, which, as shown in Fig. 10, are engaged by springs $v^*$, the opposite ends of which are secured to pins in the end of the roller. The shafts are thus normally turned to press the draw-folding blades against one wall of the said slots, such wall being, preferably, the rearward wall when the blade in its travel is above the driving shaft. Upon the opposite ends of the said shafts from the arm referred to, are tappets $v^6$ and $v^7$, respectively, which are adapted to engage cams $v^8$ and $v^9$, respectively, the latter being formed upon a sleeve or partial sleeve W which is supported on a side frame C and extends along the under side of the driving shaft E. The said cams are formed at different points along the said sleeve, and the said tappets are correspondingly placed, so that each tappet engages its own cam without interference from the other. The action of the said cams is to turn the shafts $v$ and $v'$ against the stress of the springs attached thereto, and thus to move the draw-folding blades away from the rear walls of their respective slots. An elastic flap $v^{10}$ is secured at one end in a recess in the periphery of the draw-folding roller, such end being the lower end when upon the rear side of the said roller. The said flap is preferably formed so that its free end normally stands away from the face of the roller.

A tucker roll X is mounted upon a shaft $x$ in the forwardly extending arms of the side frames, which shaft is provided with a pinion $x'$ that engages the pinion F on the driving shaft. The tucker roll is provided with tucker blades $x^2$ which serve to tuck a fold of paper back of the draw-folding blades when the latter are moved away from the rear walls of their respective slots. A shaft Z is mounted in the upper arms of the side frames C, and is provided with a pinion $z$ which engages the pinion upon the driving shaft. A roller $z'$ is mounted upon the shaft Z, and a knife A' is seated in a preferably radial slot in the said roller. The roller V is provided with a groove $v^{11}$ that is adapted to receive the edge of the said knife. The knife A' is preferably serrated. If desired, a second knife can be mounted in the roller V to coöperate with the knife A', and such knife can be yieldingly mounted so that it can tilt in co-acting with the knife A'. A rod B' extends between the side frames parallel to but separated from the upper, rear portion of the periphery of the draw folding roller.

Figure 8:
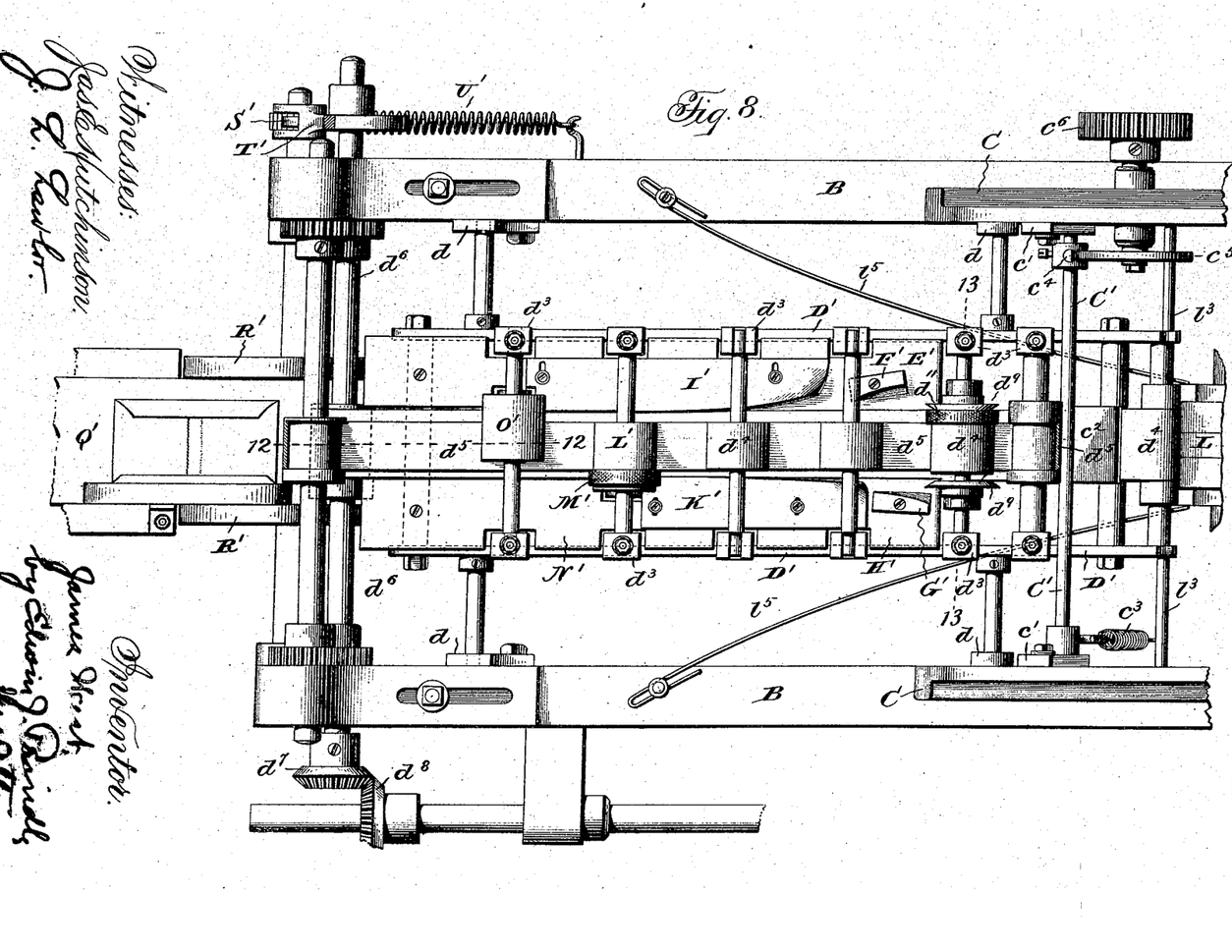
Fig. 8 is a plan view of the rear portion of the machine, the upper lap of the upper belt being omitted.

A shaft C' is journaled in bars $c'$ that are adjustably secured to the inner faces of the rear arms of the side frames, as by screws passing through slots in the said arms and into the side frames. A folding blade or plate $c^2$ is secured to the said shaft, and is normally held downward by a spring $c^3$ shown in Fig. 8, that is secured to the frame and to an arm on the said shaft. The shaft is rocked and the plate is raised by the action on an arm $c^4$ secured to the said shaft of a cam $c^5$ that is secured to the inner end of a short shaft journaled in the adjacent side frame, the outer end of the said shaft being provided with a pinion $c^6$ that meshes with the pinion on the driving shaft.

Figure 11:
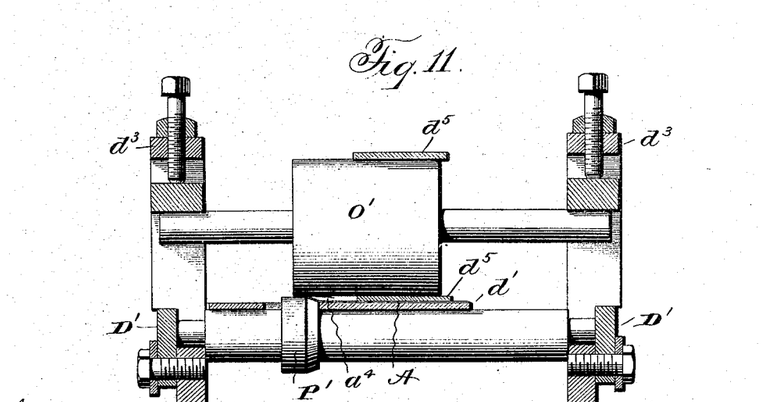
Fig. 11 is a sectional view of the conveyer taken on the line 11—11 of Fig. 7.
Figure 12:
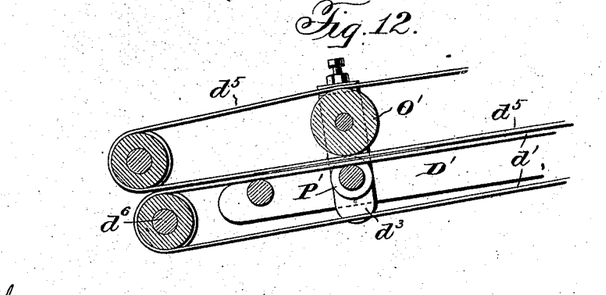
Fig. 12 is a partial sectional view of the conveyer taken on the line 12—12 of Fig. 8.

A frame consisting of two side bars D' that are connected by a series of shafts is mounted at the rear of and between the side frames C. The bars D' are supported by bars $d$ that extend down to and are secured to the beams B as by bolts passing through slots in the said bars. A belt $d'$ passes over and under a series of rolls $d^2$, journaled upon the shafts connecting the bars D. The forward and rearward rollers of the said series are flanged or grooved to prevent lateral movement of the said belt. The belt $d'$ runs but a little below the shaft $c'$ and extends near the rear face of the draw folding roller V. A series of bearing brackets $d^3$ extends upward from the bars D', and in the said brackets are mounted a series of rolls $d^4$, the said brackets being slotted to receive the ends of the shafts of the said rolls, so that such rolls can rise and fall. A belt $d^5$ extends over and under the said upper series of rolls and is pressed by the said rolls against the belt $d'$ at points over the rolls of the lower series. The belt $d^5$ is at least as narrow as the distance between the top and bottom flaps $a^4$ and $a^3$ of the envelop, while the belt $d'$ is wider than the belt $d^5$. The rear rolls of the two series upon which the belts are mounted are geared together, and the lower of such rolls is mounted upon a shaft $d^6$ that is provided with a bevel pinion $d^7$, which pinion engages a bevel pinion upon a shaft $d^8$, the latter receiving motion by the intermeshing of a bevel pinion upon its forward end with a similar pinion upon the shaft H of the cutter cylinder. The shaft of the second roll from the forward end of the upper series of rolls is provided with scoring disks $d^9$ which engage scoring rolls $d^{10}$ upon the shaft immediately below it. Such second roll is provided with an enlargement, preferably in the form of a rubber band $d^{11}$ which is of the same thickness as the belt $d^5$, and is adjacent to the portion of such roll which engages said belt, so that the portion of the envelop which will be covered by sealing flap is held firmly during the scoring operation. At the rear of such second roll, upon a plate E' which is supported upon the bars D' is a deflector F', which is provided with a warped surface for the purpose of raising the sealing flap ready to be folded over upon the back of the envelop. A similar deflector G' is mounted upon a plate H' on the opposite side of the belt $d'$ for raising the bottom flap $a^3$ of the envelop preparatory to folding it down and sealing it. Folding plates I' and K', respectively, are secured upon the plates E' and H' to the rear of the deflectors F' and G' to gradually fold down the top and bottom flaps of the envelop. An upper roller L' is provided with a band M' similar to the band $d^{11}$ for the purpose of pressing the bottom flap of the envelop firmly upon the flaps $a'$ and $a^2$ to secure the same thereto, and the folding plate K' is cut away to permit said roller to reach the envelop. A plate N' secured to the plate H' at the rear of the folding blade K' serves to hold the bottom flap down after leaving the roller L'. The folding blade I' does not fold the sealing flap of the envelop down upon the flaps $a'$ and $a^2$, but leaves such flap standing sufficiently away from the envelop to prevent accidental sealing. The fold between the sealing flap and the front of the envelop is sharpened to the desired extent by being passed between an upper roller O', which extends over the said fold and the flap, and a lower roller P', the said rollers contacting only along the said fold, and the lower roller being beveled so that its face recedes from the face of the upper roller toward the belt $d'$, as shown in Fig. 11. A horizontal conveyer belt Q' passes over a pulley R' journaled in the beams B immediately below the exit between the belts $d'$ and $d^5$. The pulley R' is operated intermittently by a pawl S' mounted upon a lever T', the latter being journaled upon the shaft of the said pulley, and the pawl engaging a ratchet fixed upon the said shaft. A spring U' secured to the said lever and to the frame tends to draw the upper end of the lever forward. A cam V' on the shaft $d^6$ causes the said lever to oscillate rearward, thus giving the pulley R' its intermittent movement.

Figure 9:
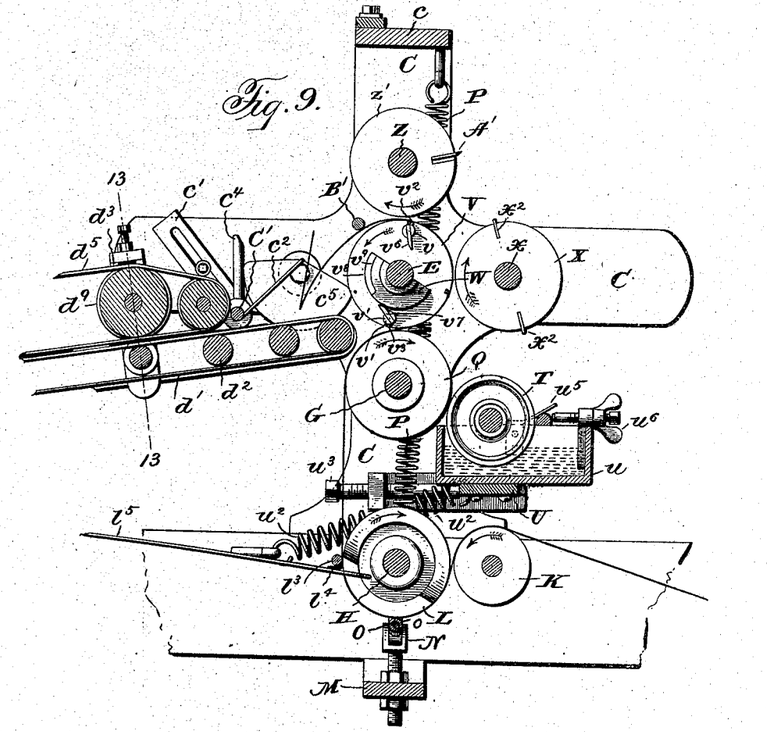
Fig. 9 is a sectional view of the central portion of the machine taken on the line 9—9 of Fig. 6.
Figure 13:
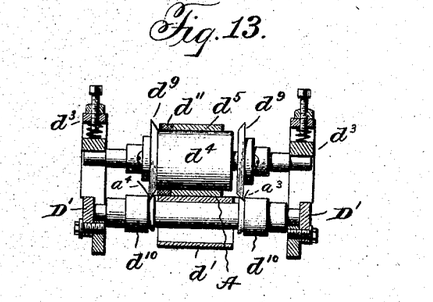
Fig. 13 is a sectional view of the conveyer and creasing rolls taken on the line 13—13 of Fig. 8.
Figure 14:
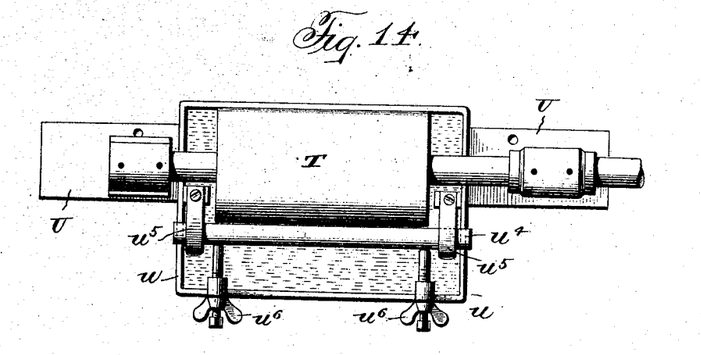
Fig. 14 is a top plan view of the glue pan and glue transfer roll, and their attached parts.

In the operation of the machine, as above illustrated, the paper is led by hand over the roller K, under the cutting cylinder; upward and around the glue-applying disks Q, and thence between the tucker roller X and the draw folding roller V. The machine is then set in motion; and, as one of the draw-folding blades $v^2$ comes to the level of the shaft E, it is moved away from the rear wall of its slot; and a fold is formed in the paper and is tucked behind the draw folding blade by one of the tucker blades $x^2$. The paper having thus been engaged by the draw-folding roller is drawn forward. Preferably, neither the glue-applying disks, the tucker roller, nor the cutter-carrying roller come in contact with the periphery of the draw-folding roll, so that the feeding of the paper is effected solely by the draw folders and the tucker blades. As the paper passes over the cutter cylinder, the cutter rolls O are drawn firmly against the edges of such cylinder by the springs P and cause the paper to be sharply severed along the edges of the said cylinder, the springs P causing said rollers to follow the cutting edges of the cutting cylinder, and in a most effective and simple manner thus to cut the edges of the strip of paper to conform to the periphery of the cutting cylinder. In practice, I have found this cutting mechanism to be exceedingly simple and effective and adapted to a wide variety of forms. As the paper travels upward on the rear side of the cutting cylinder, the springs $l^5$ engage the severed portions of the paper and detach them, should they not already have fallen away. The tension of the said springs toward each other causes them to closely follow the cutting edge of the cylinder, so that they always act along the line of cutting, and most effectively separate the severed portions from the strip of paper. As the paper passes upward from the cutting cylinder, and over the glue applying disks Q, the latter apply glue to the upper and lower flaps $a^4$ and $a^3$, respectively, of the envelop. At the same time, the type bar S applies glue to a portion of the under face of the end flap $a'$. As the paper passes upward between the draw folding roller and the tucker roller, a fold is formed along the line between the end flap $a'$ and the body of the envelop, the said flap extending forward along the face of the draw folding cylinder. As the said roller carries the paper onward, the end flap $a'$ runs over the rod B', and when the fold at the base of the said flap is carried beneath the said rod by the movement of the draw-folding roller, the said flap is turned back upon the envelop into the position shown in Figs. 2 and 9. As the line between the end flap $a^2$ and the body of the envelop approaches the plane of the shafts of the draw folding and tucker rollers, the second tucker blade $x^2$ forms a fold in the paper and tucks it behind the second draw-folder $v^3$. As the formation of this second fold requires some slack in the paper, I prefer to form the cam $v^8$, which operates the forward draw-folder, so that said draw folder releases its fold just before the second fold is formed. If desired, however, the slack for the second fold can be obtained by drawing the paper forward from the roll of paper and printing mechanism, instead of allowing it to slip backward from the first draw-folder. As the draw-folding roller continues its movement, the elasticity of the paper causes the body of the envelop to stand away from the draw folding cylinder and to project into the space between the folding blade or plate $c^2$ and the lower belt $d'$. The cutter A' presses against the paper over the groove in the draw-folding roller and severs the paper. As the paper is under tension, this can be done without causing the cutter to cut against an edge or surface. The life of the cutter is, thereby, prolonged. The cutting edge of the cutter A' is a toothed or serrated one, a formation which facilitates the cutting operation, in view of the conditions under which the paper is severed, as the sharp points or teeth readily enter the tight paper. Further movement of the said roller causes the forward end of the body of the envelop to travel forward until it is engaged between the belts $d'$ and $d^5$. At about this time, as illustrated in Fig. 10, the rearward flap $a^3$ of the envelop is bent forward and downward by the elastic strip $v^9$ until said flap $a^3$ is beneath the folding plate or blade $c^3$. The latter is then moved downward, causing the flap $a^2$ to overlie the flap $a'$ in position to pass between the belts $d'$ and $d^5$. The second draw-folder now releases the envelop, and it passes between the said belts. As the envelop passes between the scoring disks $d^9$ and the scoring roll $d^{10}$, see Fig. 13, the scores between the body of the envelop and the top and bottom flaps $a^4$ and $a^3$, respectively, are formed. This action also causes such flaps to stand at an angle to the body of the envelop. The motion of the belts carries the said flaps against the deflectors F' and G', which latter raise the flaps further up. The said flaps then come in contact with the folding blades I' and K', respectively, and the bottom flap is turned down upon the top and bottom flaps $a'$ and $a^2$, and is firmly secured thereto by the pressure of the band M' against the roller and belt beneath. The upper flap, as stated, is turned over, as shown in Fig. 11, and the crease at its base is completely formed between the rollers O' and P', respectively, but such flap is not brought into contact with the back of the envelop. The envelop then passes from between the belts $d'$ and $d^5$ upon the belt Q', which, by its step-by-step movement, causes the envelops to accumulate in a position in which they overlie each other and are readily gathered into bunches.

Figure 18:
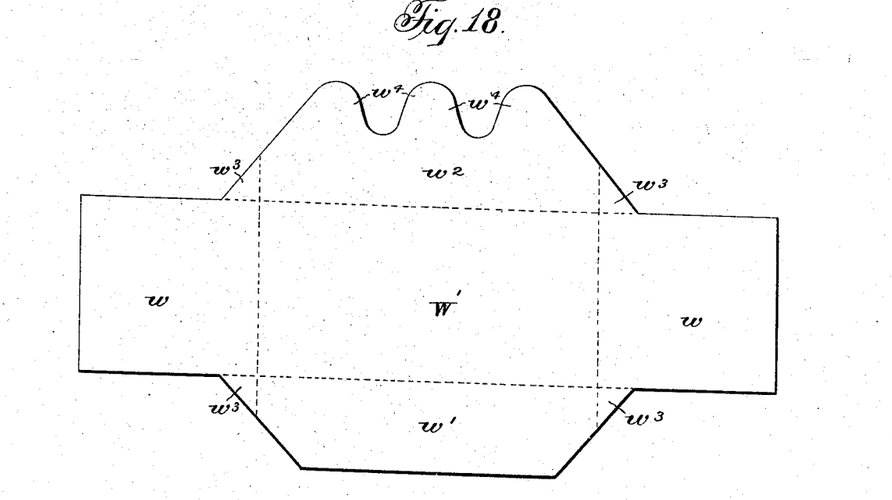
Figs. 18 and 19 are, respectively, views of a blank and a completed envelop of another form which my machine is adapted to make.
Figure 19:
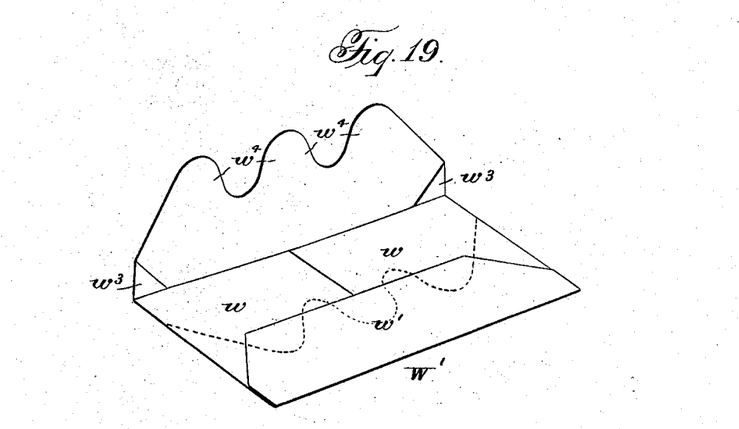

In Figs. 18 and 19 are respectively illustrated a blank and the completed envelop made therefrom, which are adapted to be made by the above-illustrated machine. Such envelop consists of a body W', end flaps $w$, a bottom flap $w'$, and a top flap $w^2$. The end flaps overlap and are secured together. Triangular sections $w^3$ connect the end flaps with the top and bottom flaps, so that, when the blank is folded, safety corners are formed. The top flap has three projections $w^4$, which are adapted to be placed upon opposite sides of the bottom flap, so that, in sealing the envelop, there will be no simple seam which can be opened, as in the ordinary envelop. This envelop is a complicated and difficult one to make by any machine with which I am familiar produced prior to my machine, but, by means of the latter machine, such envelop can be made as readily as the simpler envelop illustrated in Figs. 1 to 4. My cutting mechanism readily forms the sinuous line of the top flap $w^2$.

In practice, I have found my machine to be an exceedingly cheap and effective one for making envelops. It has comparatively few parts, and yet produces accurate work with great rapidity.

It is obvious that changes can be made in the construction shown and described which will be within the scope of my invention.

Having thus described my invention, what I claim is:—

1. In an envelop machine, the combination of means for feeding a strip of material, means for cutting the edges of such strip to form the edges of the top and bottom flaps of an envelop, means for turning over the end flaps, means for turning over the top and bottom flaps of the envelop after said end flaps have been turned over and means for causing the several means to act in the order named.

2. In an envelop machine, the combination of means for feeding a strip of material, means for cutting the edges of such strip to form the edges of the top and bottom flaps of an envelop, means for turning over the end flaps, means for turning over the top and bottom flaps of the envelop and means for causing the several means to act in the order named.

3. In an envelop machine, the combination of means for feeding a strip of material, means for cutting the edges of such strip to form edges of the top and bottom flaps of an envelop, means for forming the end folds of the envelop, means for turning over the end flaps of the envelop, means for turning over the top and bottom flaps of the envelop after said end flaps have been turned over and means for causing the several means to act in the order named.

4. In an envelop machine, the combination of means for feeding a strip of material, means for cutting the edges of such strip to form the edges of the top and bottom flaps of an envelop, means for forming the end folds of the envelop, means for turning over the end flaps of the envelop, means for subsequently turning over the top and bottom flaps of the envelop and means for causing the several means to act in the order named.

5. In an envelop machine, the combination of means for feeding a strip of material, means for cutting the edges of such strip to form the edges of the top and bottom flaps of an envelop, means for turning over the forward end flap of the envelop, means for severing the blank from the strip, means for turning over the remaining end flap of the envelop and means for causing the several means to act in the order named.

6. In an envelop machine, the combination of means for feeding a strip of material, means for cutting the edges of such strip to form the edges of the top and bottom flaps of an envelop, means for turning over the forward end flap of the envelop, means for severing the blank from the strip, means for turning over the remaining end flap of the envelop, and means for causing the several means to act in the order named.

7. In an envelop machine, the combination of means for feeding a strip of material, means for cutting the edges of such strip to form the edges of the top and bottom flaps of an envelop, means for applying adhesive material to the strip, means for turning over the forward end flap of the envelop, means for severing the blank from the strip, means for turning over the remaining end flap of the envelop and means for causing the several means to act in the order named.

8. In an envelop machine, the combination of means for feeding a strip of material, means for cutting the edges of such strip to form the edges of the top and bottom flaps of an envelop, means for applying adhesive material to the strip, means for turning over the forward end flap of the envelop, means for severing the blank from the strip, means for turning over the remaining end flap of the envelop, and means for causing the several means to act in the order named.

9. In an envelop machine, the combination of means for feeding a strip of material, means for cutting the edges of such strip to form the flaps of an envelop, a single mechanism for applying adhesive material to the strip, means for turning over the end flaps of the envelop, means for turning over the flaps at the edges of the strip and means for causing the several means to act in the order named.

10. In an envelop machine, the combination of means for feeding a strip of material, means for cutting the edges of such strip to form the flaps of an envelop, a single mechanism for applying adhesive material to the strip, means for turning over the end flaps of the envelop, means for turning over the flaps at the edges of the strip, and means for causing the several means and said mechanism to act in the order named.

11. In an envelop machine, the combination of means for feeding a strip of material, means for cutting the edges of such strip to form the edges of flaps of an envelop, means for applying adhesive material to the strip, means for turning over the forward flap, means for severing the blank from the strip, means for turning over the rear flap, means for turning over the flaps formed at the edges of the strip and means for causing the several means to act in the order named.

12. In an envelop machine, the combination of means for feeding a strip of material, means for cutting the edges of such strip to form the edges of flaps of an envelop, means for applying adhesive material to the strip, means for turning over the forward flap, means for severing the blank from the strip, means for turning over the rear flap, means for turning over the flaps formed at the edges of the strip, and means for causing the several means to act in the order named.

13. In an envelop machine, the combination of means for feeding a strip of material, means for cutting the edges of such strip to form the edges of flaps of an envelop, a single means for applying adhesive material to the strip, means for turning over the forward flap, means for severing the blank from the strip, means for turning over the rear flap, means for turning over the flaps formed at the edges of the strip and means for causing the several means to act in the order named.

14. In an envelop machine, the combination of means for feeding a strip of material, means for cutting the edges of such strip to form the edges of flaps of an envelop, a single means for applying adhesive material to the strip, means for turning over the forward flap, means for severing the blank from the strip, means for turning over the rear flap, means for turning over the flaps formed at the edges of the strip, and means for causing the several means to act in the order named.

15. In an envelop machine, the combination of means for feeding a strip of material, means for applying adhesive material to but one side of such strip, means for cutting a blank from such strip, and means for folding such blank to form the envelop.

16. In an envelop machine, the combination with means for feeding a strip of material, a single means for applying adhesive material to but one side of said strip, means for cutting a blank from said strip, and means for folding said blank to form an envelop.

17. In an envelop machine, the combination of means for guiding a strip of material, means for applying adhesive material to but a single side of such strip, and means for feeding and folding said strip, said means for feeding and folding consisting of a draw folding cylinder having grippers thereon which engage only the side of the strip opposite that having adhesive material thereon.

18. In an envelop machine, the combination of means for guiding a strip of material, a draw folding roller having two or more draw folders, means for applying adhesive material to said strip before it reaches the draw folding roller, and means for engaging the strip with the draw folding roller, said last-named means engaging the strip only along the lines where folds are to be formed.

19. In an envelop machine, the combination of means for moving a strip of material to a draw folding roller, means for guiding said strip during its movement, a draw folding roller having two or more draw folders, means for applying adhesive material to said strip before it reaches the draw folding roller, and means for engaging the strip with said draw folding roller along lines where folds are to be formed.

20. In an envelop machine, in combination of means for guiding a strip of material, a roller having draw folders thereon, means for engaging said strip with said draw folders, and a strip or flap secured to said draw folding roller at a point in the rear of the last draw folder and adapted to fly up and bend over the end of the blank which overlies said flap.

21. In an envelop machine, the combination of means for guiding a strip of material, a draw folding roller having two or more draw folders thereon, upper and lower belts or rollers, the lower belt or roller being nearer to said draw folding roller than the upper belt or roller, a folding blade or plate movable above the portion of the lower belt or roller that is beyond the upper one, means for partially folding the end flaps of the blank and directing said blank beneath said folding blade or plate, and means for moving said folding plate or blade, whereby said flaps are more completely folded between said plate and said lower belt or roller before passing beneath said belts or rollers.

22. In an envelop machine, the combination of means for guiding a strip of material, a draw folding roller, having two or more draw folders thereon, upper and lower belts or rollers, the lower belt or roller being nearer to said draw folding roller than the upper belt or roller, a folding blade or plate pivoted above the portion of the lower belt or roller that is beyond the upper one, means for partially folding the end flaps of the blank and directing said blank beneath said folding blade or plate, and means for moving said folding plate or blade, whereby said flaps are more completely folded between said plate and said lower belt or roller before passing beneath said belts or rollers.

23. In an envelop machine, the combination of means for guiding a strip of material and applying adhesive material thereon, a draw folding roller having two or more draw folders mounted thereon, means for engaging said strip with said draw folders, means for severing said strip at a point beyond or in rear of said draw folders, a movable strip or flap secured to said roller in rear of said last draw folder, upper and lower belts between which the folded blank is adapted to pass, said lower belt or roller extending nearer to said draw folding roller than said upper belt or roller, and a folding blade or plate movable above the extended portion of said lower belt or roller.

24. In an envelop machine, the combination of upper and lower belts or rollers that are adapted to receive between them an envelop, the lower of such belts or rollers extending beyond the upper one, means for presenting an envelop over the extended portion of said lower belt or roller with one or more of its flaps partly folded over, and a plate or folder situated above said extended portion of the lower belt or roller and pivoted at its end nearest to said upper belt or roller and adapted to coöperate with said lower belt or roller to complete the folding of said flap or flaps.

25. In an envelop machine, the combination of means for guiding a strip of material and applying adhesive material thereon, a draw folding roller having two or more draw folders mounted thereon, means for engaging said strip with said draw folders, means for severing said strip at a point beyond or in rear of said draw folders, a movable strip or flap secured to said roller in rear of said last draw folder, upper and lower belts between which the folded blank is adapted to pass, said lower belt or roller extending nearer to said draw folding roller than said upper belt or roller, a folding blade or plate movable above the extended portion of said lower belt or roller, and a stationary rod or projection against which the forward flap of the blank is adapted to contact to be turned back upon the blank.

26. In an envelop machine, the combination of means for forming a blank, means for applying adhesive material thereto, means for turning over the end flaps of the blank, and means for turning over the side flaps of the blank upon the end flaps thereof, said latter means consisting of upper and lower belts or rollers between which the central portion of the blank is adapted to pass, folders or deflectors for turning over the side flaps of the blank upon the latter, and means for pressing one of said side flaps upon the blank.

27. In an envelop machine, the combination of means for forming a blank, means for applying adhesive material thereto, means for turning over the end flaps of the blank, and means for turning over the side flaps of the blank upon the end flaps thereof, said latter means consisting of upper and lower belts or rollers between which the central portion of the blank is adapted to pass, folders or deflectors for turning over the side flaps of the blank upon the latter, means for pressing one of said flaps upon the blank, and means for defining the crease at the base of the opposite flap.

28. In an envelop machine, the combination of upper and lower belts between which a blank is adapted to be received, said upper belt being at least as narrow as the distance between the side flaps of the blank when said flaps have been folded, a shaft having scoring disks thereon to score the lines at the bases of said side flaps, and a roller upon said shaft with said scoring disks adapted to engage the portion of the blank which will be covered by one of said side flaps.

29. In an envelop machine, the combination of upper and lower belts between which a blank is adapted to be received, said upper belt being at least as narrow as the distance between the side flaps of the blank when said flaps have been folded, means for folding one of said flaps, and means for pressing said folded flap upon the blank, said last-mentioned means consisting of rollers on opposite sides of said belt, the roller which bears against the narrower belt having an enlargement that is adapted to engage and bear upon the folded flap.

30. In an envelop machine, the combination means for defining the fold at the base of the sealing flap of an envelop, comprising a pair of belts adapted to engage between them a portion of the blank not covered by the sealing flap, an upper cylindrical roller adapted to bear upon the outer face of one of said belts, and a lower roller that is cylindrical where it engages the portion of the blank to be folded and that is reduced in diameter beneath the remaining portions of the blank.

31. In an envelop machine, the combination with a feeding device for feeding a strip of paper through the machine and comprising a pair of rollers, one of said rollers having a recess in its periphery, of means for applying a tensile strain to the strip of paper as it passes between said pair of rollers, a knife provided with sharp pointed teeth adapted to puncture the strip of paper, said knife being carried by the other of said rolls in a position to register with the center of said recess.

In testimony that I claim the foregoing I have hereunto set my hand.

JAMES WEST

Witnesses:
EDWARD STEVENSON,
T. WM. KIENAST.